(12) United States Patent
Horev et al.

(10) Patent No.: US 11,644,988 B2
(45) Date of Patent: May 9, 2023

(54) RESOURCE ALLOCATION IN A STORAGE SYSTEM

(71) Applicant: VAST DATA LTD., Tel Aviv (IL)

(72) Inventors: Alon Horev, Tel Aviv (IL); Ido Yellin, Tel Aviv (IL); Asaf Levy, Tel Aviv (IL); Alex Turin, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 17/304,241

(22) Filed: Jun. 16, 2021

(65) Prior Publication Data

US 2022/0269426 A1 Aug. 25, 2022

Related U.S. Application Data

(63) Continuation of application No. 17/180,672, filed on Feb. 19, 2021.

(51) Int. Cl.
*G06F 3/06* (2006.01)
*G06F 9/50* (2006.01)

(52) U.S. Cl.
CPC .......... *G06F 3/0631* (2013.01); *G06F 3/0604* (2013.01); *G06F 3/067* (2013.01); *G06F 3/0613* (2013.01); *G06F 9/5083* (2013.01)

(58) Field of Classification Search
CPC .... G06F 3/0631; G06F 3/0613; G06F 9/5083; G06F 3/067; G06F 3/0604; G06F 9/5088
See application file for complete search history.

(56) References Cited

U.S. PATENT DOCUMENTS

| | | | | |
|---|---|---|---|---|
| 7,957,398 | B1* | 6/2011 | Yochai | H04L 49/90 370/395.42 |
| 8,972,656 | B1* | 3/2015 | Armangau | G06F 3/0635 711/114 |
| 2007/0288738 | A1* | 12/2007 | Dale | G06F 21/575 713/2 |
| 2014/0122848 | A1* | 5/2014 | Easwaran | G06F 9/4887 712/E9.016 |
| 2014/0215482 | A1* | 7/2014 | Satoyama | G06F 3/061 718/104 |
| 2016/0306574 | A1* | 10/2016 | Friedman | G06F 3/0638 |
| 2018/0285151 | A1* | 10/2018 | Wang | G06F 9/5083 |
| 2019/0018808 | A1* | 1/2019 | Beard | G06F 12/0826 |
| 2019/0041952 | A1* | 2/2019 | Alameldeen | G06F 1/329 |
| 2019/0121545 | A1* | 4/2019 | La Fratta | G06F 3/0679 |
| 2019/0265909 | A1* | 8/2019 | Frolikov | G06F 3/061 |
| 2019/0310892 | A1* | 10/2019 | Frolikov | G06F 9/4881 |
| 2020/0249867 | A1* | 8/2020 | Bono | G06F 3/0683 |
| 2021/0019258 | A1* | 1/2021 | Dorsey | G06F 12/0802 |
| 2021/0255903 | A1* | 8/2021 | Wang | G06F 9/546 |
| 2021/0314404 | A1* | 10/2021 | Glek | H04L 49/10 |
| 2021/0344749 | A1* | 11/2021 | Karlsson | H04L 67/1029 |

* cited by examiner

*Primary Examiner* — Charles Rones
*Assistant Examiner* — Tong B. Vo
(74) *Attorney, Agent, or Firm* — Reches Patents

(57) ABSTRACT

A method for resource allocation in a storage system, the method may include determining to reduce a load imposed on a compute core of the storage system, wherein the compute core is responsible for executing (a) one or more background task shards, and (b) at least one non-sharded task for responding to an input/output (I/O) request sent to the storage system; and reducing the load imposed on the compute core by reallocating at least one background task shard of the one or more background task shards to another compute core of the storage system.

17 Claims, 4 Drawing Sheets

RESOURCE ALLOCATION IN A STORAGE SYSTEM

TECHNICAL FIELD

The present disclosure generally relates to the field of data storage, and more particularly to resource allocation in storage systems.

BACKGROUND

Load balancing in multiple-node storage systems aims to assign incoming input/output (I/O) requests to different compute nodes, by defining responsibilities based on address ranges (or file names, and/or file offsets) indicated in the I/O requests.

When assigning responsibilities according to parameters within the I/O requests, a receiving compute node needs to determine a compute node that is assigned to the I/O request, and in a case where the receiving compute node is not the assigned compute node, the I/O request should be rerouted to the compute node that is responsible for handling the requested address range. In some cases, the response should be sent to the requesting entity (located outside the storage system—for example, a client computer) via the receiving compute node to which the client computer sent the request, thereby leading to more rerouting operations.

Rerouting I/O requests imposes load on the network that connects the compute nodes and further increases the latency experienced by the client computers that access the storage system.

There is a need to balance the load on compute nodes in a storage system, while keeping a minimal latency experienced by client computers.

SUMMARY

There may be provide a storage system, a method and a non-transitory computer readable medium for resource allocation in a storage system.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
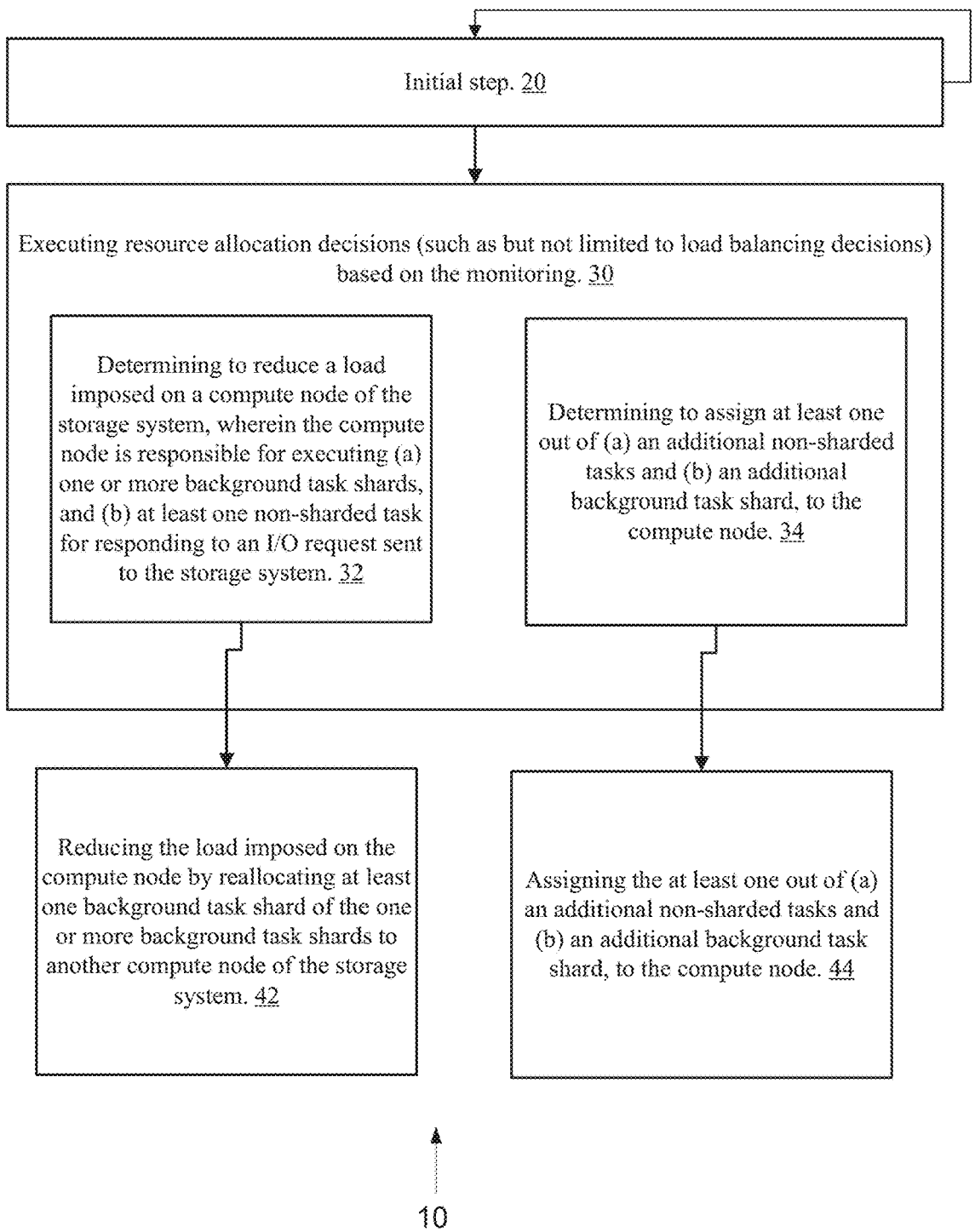
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There is provided a system, a method and a non-transitory computer readable medium for resource allocation in a storage system such as a large scale storage system.

A large scale storage system may include tens, hundreds, thousands, hundred-thousands and even more storage nodes and tens, hundreds, thousands, hundred-thousands and even more compute nodes.

A storage node may include multiple storage devices such as a volatile storage device, and non-volatile storage devices. A storage device may include a Solid State Device (SSD), a non-volatile random access memory (NVRAM), a volatile random access memory (RAM), and the like.

Non-limiting examples of compute nodes and storage nodes are illustrated in U.S. Pat. No. 11,240,306 B2 issued on Feb. 1, 2022, which is incorporated herein by reference.

For simplicity of explanation some of the following text may refer to a method.

There may be provided a method for resource allocation that provides effective load balancing while reducing and minimizing the impact of the load balancing on the response time of the storage system.

At least part of the compute workload imposed on the storage system is logically sharded into multiple units called shards. A shard can be regarded as a portion of the total compute workload of the storage system.

The method may distinguish between sharded tasks and non-sharded tasks. Sharded tasks are tasks that are partitioned to shards while non-sharded tasks are not sharded.

The sharded tasks may be referred to as background tasks, the background tasks may be partitioned to background task shards. A background task shard may be referred to as a shard.

Non-sharded tasks may be involved in responding to I/O requests sent to the storage system.

The response time of the storage system to I/O requests may be more sensitive to (for example is more affected by) (a) an execution of the I/O request, than to (b) an execution of the one or more background task shards.

Shards of sharded tasks and non-sharded tasks are dynamically assigned to compute cores of the compute nodes of the storage system, so that each compute core provides compute resource to one or more shards of sharded tasks and/or to one or more non-sharded tasks.

The number of the compute cores can be changed dynamically upon adding compute nodes to the storage system or upon removing compute nodes from the storage system.

A shard can be easily relocated among compute cores. The responsibilities of the shard remain unchanged upon relocation, i.e., the shard is associated with the same responsibilities even when operated under different compute cores.

Shard relocation involves minimal disruption to ongoing activities. If the shard being relocated is responsible for background storage operations, then no latency is experienced by client computer and applications that performs I/O operations.

Relocation of shards is performed for offloading busy compute cores, or to balance the workload across compute cores, or when the configuration of the storage system is changed and there is a need to divide the existing shards across a larger or a smaller number of compute cores.

Each shard may be assigned with one or more storage tasks that generate a portion of the total workload, and further assigned with a portion of the metadata and data spaces associated with the storage task. Each shard may have a unique identifier in the storage system that is known to all the compute cores in the storage system.

According to an embodiment, the storage tasks that are associated with shards are related to background storage operations, i.e., storage operations that are not directly related to responses to clients' requests, e.g., I/O requests. I/O requests and other storage requests received from client computers that are coupled to the storage system may be assigned to compute core in a different manner that is not related to the shards. According to another embodiment, part of the shards may be assigned with background tasks and part of the shards may be assigned with foreground tasks associated with clients' requests.

The background tasks associated with shards may be, for example: migration of data (among different storage devices or between a temporary storage space and a permanent storage space), defragmentation, deletion of large file areas, data reduction (compression, deduplication), RAID operations, etc.

Different shards may be associated with different storage tasks. For example, part of the shards may be associated with data reduction tasks and other part of the shards may be associated with storage tasks related to filesystem tasks, etc.

The shards are also assigned with portions of large metadata and data space that are related to the type of tasks handled by the shards. For example: each shard that is associated with data reduction may be associated with a portion of deduplication metadata (e.g., deduplication hash tables). As for another example, each shard that is associated with filesystem tasks may be associated with a portion of a huge metadata related to filesystems.

An example of how a portion of filesystem metadata is assigned to shards may include: each file in the system has an identifier (e.g., the file handle or filename) that can be hashed, or be subject to other formula that can be applied on the file identifier, so as to provide a key to entries in the metadata. The key may define a root of a tree that holds all the metadata of a file. Each shard may be assigned with a range of keys that are associated with metadata trees of files or other objects, or with a formula that depends on the shard identifier, so as to define which keys (i.e., which files) are assigned to the shard. A large file may be further split among shards, therefore each shard may be assigned with file keys and offsets associated with the keys—all being defined by a formula that is based on the shard identifier.

Another example of a space that may be split among shards is a temporal storage space for storing data of write requests. Data of write requests may be stored in a non-volatile memory (NVRAM) before being acknowledged to the clients' computers that sent the requests. Background processes, handled by the shards, may include migrating the data stored in the NVRAM to a permanent storage, e.g., SSD devices. The migration may further involve striping data into RAID stripes, data reduction, encryption, and the like. The temporal space, such as the NVRAM, may be split among shards, by using a formula that is based on the shard identifier and on offsets of sections within the NVRAM, so that each shard is associated with multiple sections of the NVRAM.

Initialization

Upon a first initialization of a newly installed storage system, the number of compute cores is obtained. The total number of shards may be determined according to the number of compute cores in the storage system.

A load balancer module that resides on one of the compute nodes is responsible for assigning shards to compute cores.

Each compute core is initially assigned with a certain number of shards N. The number of shards can be determined in a more flexible manner, as being within a range of shards: N−e to N+e, where e is an integer fraction of N. This range of numbers enables some tolerance that prevents excessive relocations when the number of assigned shards are slightly different from N.

The load balancer informs each compute core about the shard identifiers that are assigned to the Compute core.

The initialization may also include assigning non-sharded tasks to the compute cores.

Shard Balancing

The following section refers to shard balancing. Any reference to shard balancing may be applied mutatis mutandis to non-sharded tasks. For example—the load balancing may include preventing from reallocating non-sharded tasks, may include allowing to reallocate non-sharded tasks (for example—while preferring to allocate shards instead of reallocating non-sharded tasks).

Shard relocation is performed when the load on the compute cores is not balanced or when the number of Compute cores is changed, i.e., upon adding new compute nodes to the storage system that increases the number of Compute cores or upon removing compute nodes from the storage system that decreases the number of Compute cores.

The compute load on each compute core is constantly (or non-constantly) monitored and measured. When sufficient statistics are gathered and the compute load on all the Compute cores is obtained, a target number of shards N' is calculated per each compute core according to its computed load and according to the compute load of the other Compute cores.

The number of shards assigned to each compute core can be defined within a range around the target number of shards N', i.e., within a range N−e to N+e.

Some Compute cores may handle resource consuming tasks that cannot be sharded (non-sharded tasks such as responding to I/O requests)—and may be (at least at certain points in time) too busy for receiving new background task shards. Another example of a non-sharded tasks are management tasks of the storage system that can be handled by one or more Compute cores of a single compute node.

Compute cores that execute non-sharded tasks may be excluded from assignments of shards or may be assigned with less shards. The excluded Compute cores may be dynamically changed. For example, the compute core that handles the management task may become non-operational when the compute node that hosts the compute core fails, and the management task is being assigned to a different compute core that is now excluded from any shards' assignments.

Adjusting to a Configuration Changes

When new compute cores are added to the storage system, part of the shards are removed from their current compute cores and added to new compute cores, so as to adjust the storage system to the compute resource addition.

The shards to be removed from current compute cores may be determined by the age of the shards, as will be explained hereinafter. The removed shards may be uniformly and randomly distributed across the new compute cores.

Prior to removing compute cores from the storage system (i.e., prior to removing compute nodes), the shards of the Compute cores to be removed are re-assigned to the other Compute cores.

Shard Relocation

The relocation of shards includes: removing shards from the previous compute cores that hosted the shards, and assigning the shards to new compute cores.

Shards are removed from either: excluded compute cores or overloaded compute cores. An overloaded compute core may be a compute core with a monitored load that exceeds a certain threshold. The certain threshold may be relative to an average compute load of all the Compute cores.

Relocating a shard may be associated with some penalty of postponing queued storage operations waiting to be handled by the shard. Therefore, the following measures are taken in order to mitigate transient metrics fluctuations of CPU load: limiting the number of shards removed from a compute core within a time window, taking into account the age of the shards, and redistributing shards in a random manner.

The number of shards removed from a compute core, within a certain time window, is limited, so that the effect of the removing can be evaluated.

Each shard that is assigned to a compute core is associated with an age, which is defined by the time it was assigned to a specific compute core, or—the time during which the shard is being hosted by the current compute core. Relocation of shards among compute cores will prefer relocating older shards over newer shards, so as not to disrupt, too frequently, the same storage operations being handled by the relocated shard.

Redistribution of shards may be performed randomly (or in any other manner) across compute cores having an available compute capacity, so that a shard that caused an overload on a certain Compute core, will not be assigned again to the same compute core, that was got overloaded because of the same shard. Random allocation may simplify (and/or reduce time allocated to) the reallocation decision. The random allocation may be replaced by a rule based decision.

Blocking Shards Removal

During a shard removal, the compute cores that currently host the shard may temporarily refuse the shard removal, because the shard is currently engaged with a storage operation that cannot be interrupted. The compute core may tag the shard as unblocked and ready for removal when the storage operation is completed. The compute core may notify the load balancer of the unblocked shard, or the load balancer may subsequently monitor the availability of a shard that was blocked, and relocate the shard when it becomes unblocked.

Evaluating Compute Load of Compute Cores

Each compute core is assigned with a compute load score that may be relative to the compute load of other Compute cores. The target number of shards per each compute core is based on the compute load score of this Compute core.

A higher load on the compute core will result a smaller target number of shards for that Compute core. The difference between the current number of shards accommodated by a monitored compute core and the target number of shards is calculated, to result a number of shards to be relocated (to be added or removed) to/from the Compute core.

A new score is constantly or periodically calculated for the Compute cores, and an adjusted target of shards number is determined per each Compute core.

The target of shard numbers of each compute core may be calculated as follows. In the following example, it is assumed that a higher load score of a compute core indicates a less loaded Compute core. The new target of shards for the compute core is:

<the current number of shards>*<load score>/<total scores of all Compute cores>

The new target may be within a range: <new target>−e to <new target+e>.

Load Determination.

Various techniques can be used for measuring compute core loads. An indication to compute core's load can be the average time it takes to accomplish a loop over all ready threads. Or in other words: how much time a ready to run thread is waiting on average to start execution. This can be implemented by counting the number of times an idle thread (that only counts resumes) resumes within a predefined time window.

In order to evaluate a busy time of a compute core, the idle time of a monitored thread running on the compute core can be measured as the amount of time the thread is available for responding to polling request versus the time it is busy doing real work.

Each time the idle time of the monitored thread is measured, the load score of the compute core is updated to reflect the contribution of the current evaluation, while providing a certain weight to the current evaluation and a larger weight to the current load score, so as to reflect the load history of the compute core.

Storage tasks of a storage system can be divided into background tasks and foreground (ingest) tasks, also referred to as asynchronous tasks and synchronous tasks. Foreground tasks are related to handling access requests received from client computers and applications (also referred to as requesting entities). These tasks are completed when data to be written is safely stored in a temporary memory and acknowledged to the client, or when read data is sent to the client.

These tasks are sensitive to latency experienced by the clients. Background tasks are storage operations that are not related directly to client requests, but rather related to maintenance of the data: migrating to a permanent storage location, striping, deduplication, etc.

A background task may follow a completion of a response of an I/O request. Thus—one or more background task shards may belong to a certain background task that is related a content written to the storage system. In this case the background task is executed after the writing of the content to the storage system.

FIG. 1 illustrates an example of method 10 for resource allocation in a storage system.

Method 10 may start by initial step 20.

Step 20 may include sharding background tasks into background task shards.

Step 20 may include monitoring the storage system—for example evaluating the load on compute cores, evaluating the status of the compute cores—for example an addition of compute cores, a reduction of compute cores, failures of compute cores, and the like.

Step 20 may be followed by step 30 of executing resource allocation decisions (such as but not limited to load balancing decisions) based on the monitoring.

Step 30 may include step 32 of determining to reduce a load imposed on a compute core of the storage system, wherein the compute core is responsible for executing (a) one or more background task shards, and (b) at least one non-sharded task for responding to an I/O request sent to the storage system.

The responsibility of the compute core may be determined by an entity of the storage system (for example a load balancer), by an entity outside of the storage system (for example by a configuring entity that may determine the mapping between requesting entities and compute cores), and the like. It should be noted that the load balancer may be located outside the storage system and/or that the configuration entity may be a part of the storage system.

Step 32 may be followed by step 42 of reducing the load imposed on the compute core by reallocating at least one background task shard of the one or more background task shards to another compute core of the storage system.

Step 42 may include at least one out of:
a. Preventing from reallocating one of the at least one non-sharded task to another compute core.
b. Reallocating one of the at least one non-sharded task to another compute core when there is no background task shard to reallocate.
c. Selecting, during the reallocation, in random the another compute core.
d. Selecting the at least one background task shard based on an age of the at least one background task shard, wherein an age of a background task shard represents a time lapsed from a reception of the background task shard by the compute core.
e. Prioritizing reallocating older background task shards over reallocating of younger background task shards.
f. Reallocating of the at least one background task shard is made to another compute core of the storage system, the other compute core has a load that is lower than the load of the compute core.

When step 42 is preceded by an addition of one or more added compute cores to the storage system—then step 42 may include reallocating the at least one background task shard to an added compute core of the storage system.

Step 30 may include step 34 of determining to assign at least one out of (a) an additional non-sharded tasks and (b) an additional background task shard, to the compute core. This may occur when one or more new compute cores are added to the storage system, when one or more compute cores fail, when they are overloaded, and the like.

Step 34 may be followed by step 44 of assigning the at least one out of (a) an additional non-sharded tasks and (b) an additional background task shard, to the compute core.

It should be noted that method 10 may apply steps 30, 42 and 44 on multiple compute cores—and that load decrement, load maintaining and load increment decisions can be made concurrently to multiple compute cores.

It should be noted that steps 20, 30, 42 and 44 may be executed by any combination of entities of the storage system—for example by one or more dedicated load processors, by one or more dedicates load monitors, by one or more compute nodes, and the like.

Figure 2:
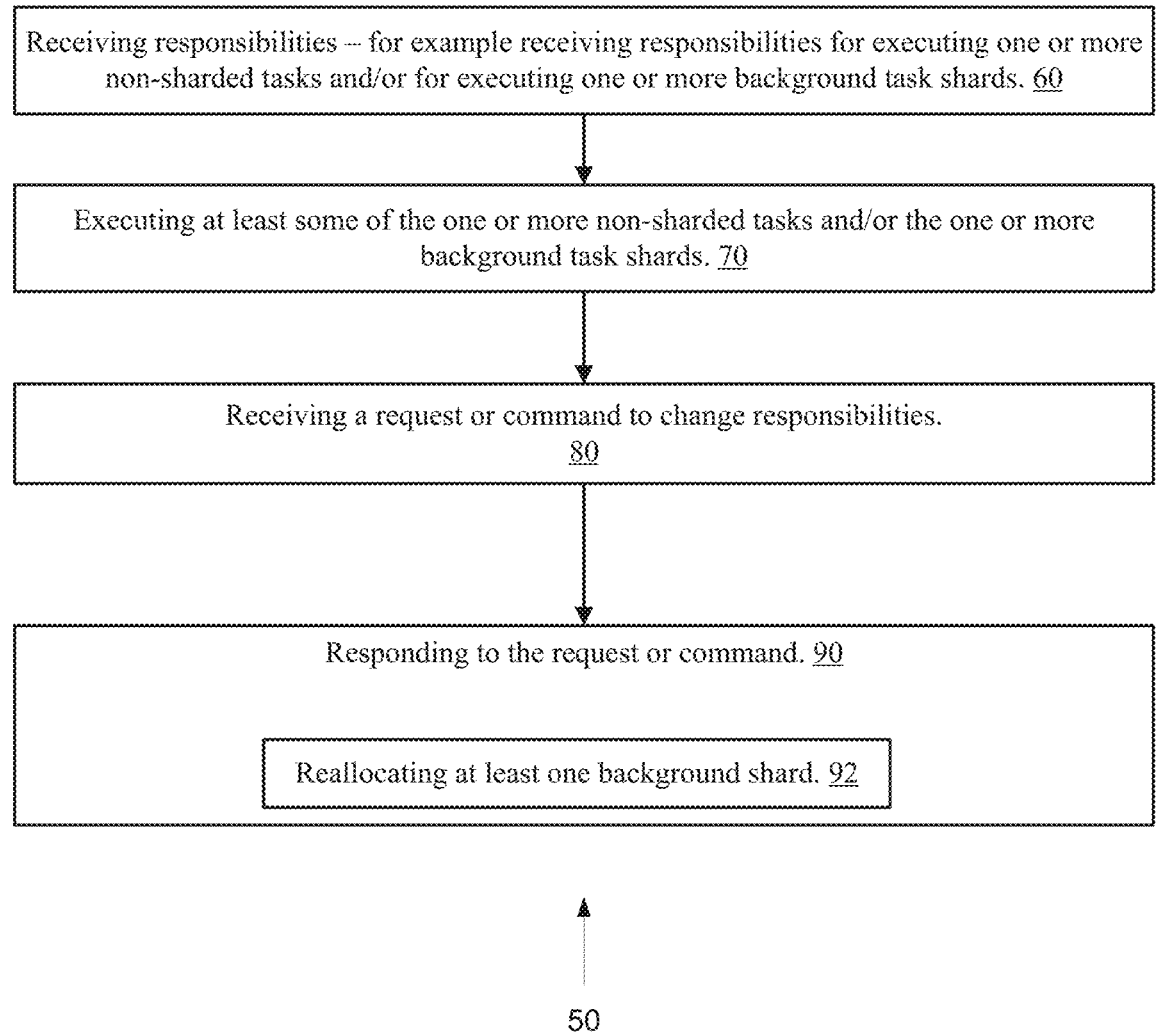
FIG. 2 illustrates an example of a method.

FIG. 2 illustrates method 50 for operating a compute core.

Method 50 may start by step 60 of receiving responsibilities—for example receiving responsibilities for executing one or more non-sharded tasks and/or for executing one or more background task shards.

Step 60 may be followed by step 70 of executing at least some of the one or more non-sharded tasks and/or the one or more background task shards. The former may include responding to I/O requests. The executing of at least some of the one or more non-sharded tasks includes executing I/O requests that were received by the compute core, regardless of the address range within the storage system and regardless any parameter included in the I/O request.

Step 60 may also be followed by step 80 of receiving a request or command to change responsibilities—for example receiving a request to reduce the load, receiving a request to reallocate at least one background shards. The request may indicate how to reduce the load, may indicate which background task shard to reallocate, may not identify the background task shard to reallocate, and the like.

Step 80 may also include receiving a request or command to increase the load, to add one or more additional non-sharded tasks to the responsibilities of the compute core, to add one or more additional background task shards to the responsibilities of the compute core, and the like.

Step 80 may be followed by step 90 of responding to the request or command.

Step 90 may include step 92 of reallocating at least one background shard.

Figure 3A:
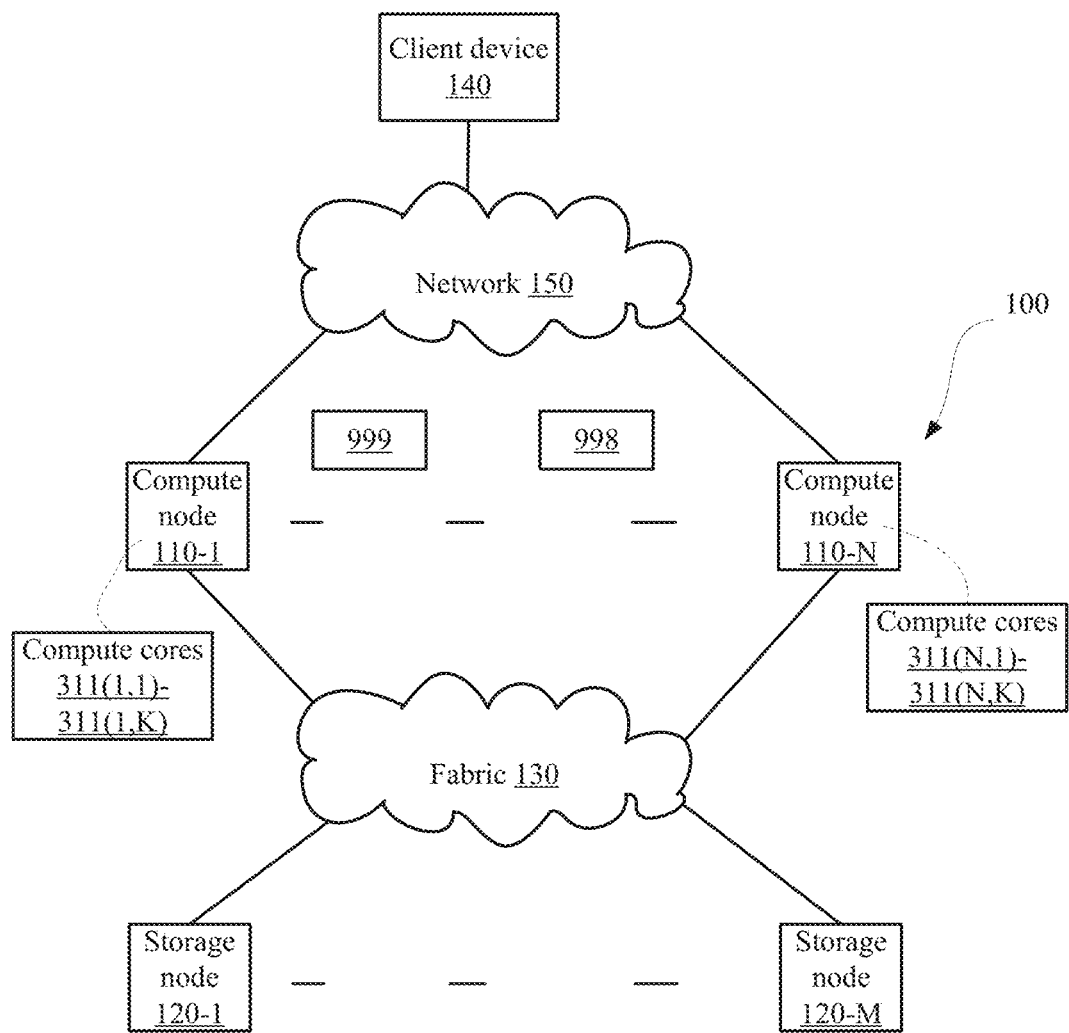
FIG. 3A is an example of a storage system.

FIG. 3A shows an example diagram of a storage system 100 according to the disclosed embodiments.

The storage system 100 includes a number of N compute nodes 110-1 through 110-N (hereinafter referred to individually as a compute node 110 and collectively as compute nodes 110, merely for simplicity purposes, N is an integer equal to or greater than 1). The compute nodes include (or may execute) multiple compute cores each—see for example compute cores 311(1,1)-311(1,K) and compute cores 311(N,1)-311(N,K).

The storage system 100 also includes a number of M storage nodes storage node 120-1 through 120-M (hereinafter referred to individually as a storage node 120 and collectively as storage nodes 120, merely for simplicity purposes, M is an integer equal to or greater than 1). The computer nodes 110 and the storage nodes 120 are connected through a communication fabric 130. M may equal N or may differ from N.

In an embodiment, a compute node 110 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 110 does not require any dedicated hardware. An example arrangement of a compute node 110 is provided in FIG. 3D.

A compute node 110 is configured to perform tasks related to the management of the storage nodes 120. In an embodiment, each compute node 110 interfaces with a client device 140 (or an application installed therein) via a network 150. To this end, a compute node 110 is configured to receive requests (e.g., read or write requests) and promptly serve these requests in a persistent manner. The network 150 may be, but is not limited to, the Internet, the world-wide-web (WWW), a local area network (LAN), a wide area network (WAN), and the like.

In an embodiment, a compute node 110 is configured to interface with different protocols implemented by the client devices or applications (e.g., TCP/IP, HTTP, FTP, etc.) and to manage the read and write operations to the storage nodes 120. The compute node 110 is further configured to translate the protocol commands into a unified structure (or language). Then, each compute node 110 is also configured to logically address and map all elements stored in the storage nodes 120.

Further, each compute node 110 may maintain the logical operations of elements and the relationships between the elements (for example, directory trees) and an element attribute (e.g., metadata) via state stored on the storage nodes 120. An element may include a file, a directory, an object, and the like. The mapping and addressing of the elements allow the compute node 110 to maintain the exact physical locations of the elements in the storage nodes 120.

In an embodiment, to efficiently read and write data to the storage nodes 120 from the physical layer, each compute node 110 performs a number of processes including data reduction, data resiliency, and Flash memory management actions (e.g., defrag, wear leveling, and so on).

It should be noted that each compute node 110 may operate in the same manner as all other compute nodes 110. In a case of a failure, any compute node 110 can replace the failed node. Further, each compute node may control and manage one or mode storage nodes 120 regardless of the specific architecture of the storage nodes 120. Therefore, there is no coupling between specific compute nodes 110 and specific storage nodes 120. As such, compute nodes can be added to the system 100 without increasing the number of storage nodes (or their capacity), and vice versa, storage nodes can be added without increasing the number of compute nodes 110.

The storage nodes 120 provide the storage and state in the system 100. To this end, each storage node 120 may include a plurality of SSDs which may be relatively inexpensive.

The storage nodes 120 may be configured to have the same capacity as each other or different capacities from each other. In an embodiment, the data stored in each storage node 120 is made redundant internally within the storage node, made redundant at a different storage node, or both. As will be discussed below with reference to FIGS. 3C and 3D, each storage node 120 further includes a non-volatile random-access memory (NVRAM) and an interface module for interfacing with the compute nodes 110.

A storage node 120 may be configured to communicate with the compute nodes 110 over the communication fabric 130. It should be noted that each compute node 110 can communicate with each storage node 120 over the communication fabric 130. There may not be a direct coupling between a compute node 110 and storage node 120.

In the embodiment, the communication fabric 130 may include an Ethernet fabric, an InfiniBand fabric, and the like. Specifically, the communication fabric 130 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 140 is part of a computer node 110. In such a deployment, the system 100 does not communicate with an external network, e.g., the network 150. It should be further noted that the communication between the compute nodes 110 and the storage nodes 120 is always facilitated over the fabric 130. It should be further noted that the compute nodes 110 can communicate with each other over the fabric 130. The fabric 130 is a shared fabric.

FIG. 3A also illustrates a load monitor 998 and a load balancer 999. The load balancer 999 and the load monitor 998 may be included in one of the compute nodes, may be located outside any of the compute nodes, may be combined, may include one or more compute cores, may be executed by one or more compute cores, and the like. There may be more than a single load balancer and a single load monitor.

Figure 3B:
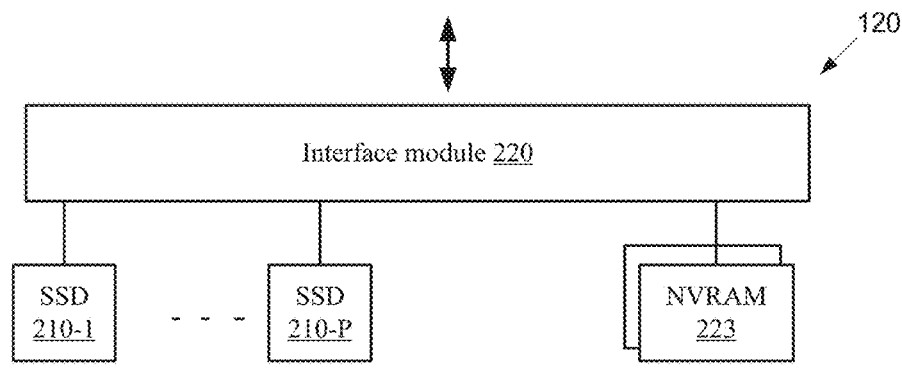
FIG. 3B is an example of a storage node.

FIG. 3B shows an example block diagram illustrating a storage node 120 according to an embodiment. The storage node 120 includes a plurality of storage devices such as SSDs 210-1 through 210-P (hereinafter referred to individually as an SSD 210 and collectively as SSDs 210, merely for simplicity purposes), at least one NVRAM, and an interface module 220.

According to the disclosed embodiments, the NVRAM 223 is utilized to reduce the number of write accesses to the SSDs 210 and the write amplification. According to an embodiment, data is written first to the NVRAM 223, which returns an acknowledgement after each such data write.

Then, during a background process, the data is transferred from the NVRAM 223 to the SSDs 210. The data may kept in the NVRAM 223 until the data is completely written to the SSDs 210. Furthermore, this writing procedure ensures no data is lost when power is off.

As the NVRAM 223 supports low write latency and parallel writes, the storage node 120 supports these features. Specifically, the low latency is achieved by acknowledging the write request once the data is saved to the NVRAM 223. The parallel writes are achieved by serving multiple concurrent write requests by the NVRAM 223 and, during the background process, independently fulfilling such requests by saving the data into the SSDs 210.

Figure 3C:
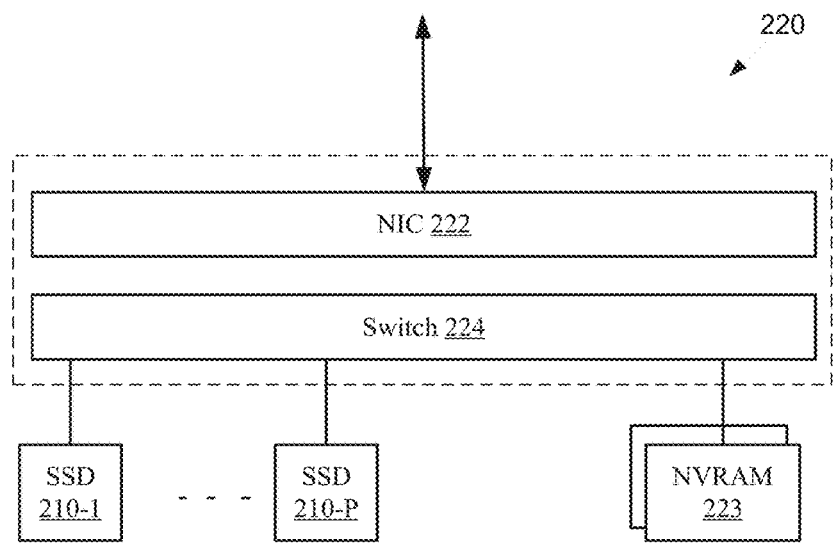
FIG. 3C is an example of an interface module of a storage node.

FIG. 3C shows an example block diagram of an interface module 220. In an example embodiment, an interface module 220 includes a network interface card (NIC) 222 and a switch 224 connected through an internal bus (not shown), e.g., a PCIe bus.

The NIC 222 allows the communication of the storage node 120 with the compute nodes (110, FIG. 3A) over the communication fabric (130, FIG. 3A). The NIC 222 may allow communication via at least one of the protocols discussed above.

The switch 224 allows the connection of the multiple SSDs 210 and NVRAM 223 to and NIC 222. In an example embodiment, the switch 224 is a PCIe switch. In another embodiment, more than one PCIe switch is utilized to support more connectivity to the SSDs. In some configurations, where non PCIe SSDs 210 are available (e.g., Ethernet SSDs), the switch 224 may be a non PCIe switch, for example an Ethernet switch.

Figure 3D:
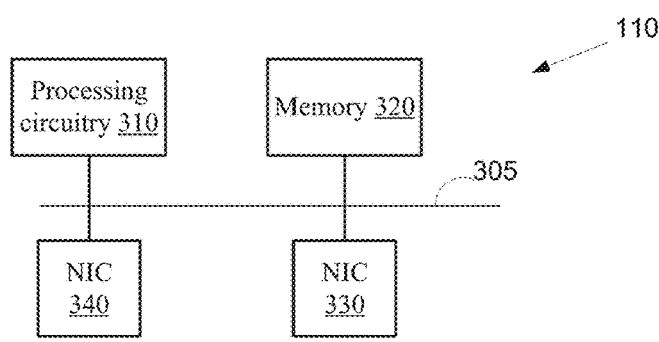
FIG. 3D is an example of a compute node.

FIG. 3D shows an example block diagram illustrating a compute node 110 according to an embodiment. The compute node 110 includes a processing circuitry 310, a memory 320, a first network interface controller (NIC) 330 and a second NIC 340. In an embodiment, the components of the compute node 110 may be communicatively connected via a bus 305.

The processing circuitry 310 may be realized as one or more hardware logic components and circuits. For example, and without limitation, illustrative types of hardware logic components that can be used include a field programmable gate array (FPGA), an Application Specific Integrated Circuit (ASIC), an Application Specific Standard Product (ASSP), a System On Chip (SOC), a general-purpose microprocessor, a microcontroller, a Digital Signal Processor (DSP), a neural network processor, and the like, or any other hardware logic components that can perform calculations or other manipulations of information.

The memory 320 may be volatile (e.g., RAM, etc.), non-volatile (e.g., ROM, flash memory, etc.), or a combination thereof. In one configuration, computer readable instructions or software to implement one or more processes performed by compute node 110 may be stored in the memory 320. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The first NIC 330 allows the compute node 110 to communicate with the storage nodes via the communication fabric 130 (see FIG. 3A) to provide remote direct memory access to data stored in the storage nodes. In an embodiment, the first NIC 330 may enable communication via RDMA protocols such as, but not limited to, InfiniBand, RDMA over Converged Ethernet (RoCE), iWARP, and the like.

The second NIC 340 allows the compute node 110 to communicate with client devices (e.g., client device 140, FIG. 3A) through a communication network (e.g., the network 150, FIG. 3A). Examples for such a network includes, but is not limited to, the Internet, the world-wide-web (WWW), a local area network (LAN), a wide area network (WAN), and the like. It should be appreciated that in some configurations, the compute node 110 may include a single NIC. This configuration is applicable when, for example, the fabric is shared.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for resource allocation in a storage system, the method comprising:
    sharding a background task into multiple background task shards, and assigning, to each of the multiple background task shards, a responsibility for a part of a storage address space, wherein different background task shards of the multiple background task shards are assigned with different parts of the storage address space;
    determining that a system status triggers a need to reduce a load imposed on a compute core of the storage system, wherein the compute core is responsible for executing (a) one or more background task shards that are assigned to the compute core from the multiple background task shards, and (b) at least one non-sharded task for responding to an input/output (I/O) request sent to the storage system; wherein the one or more background task shards are related to tasks that differ from responding to I/O requests sent to the storage system; and
    reducing the load imposed on the compute core by reallocating at least one background task shard of the one or more background task shards, being executed by the compute core, to another compute core of the storage system, without changing the responsibility of the at least one background task shard, upon the reallocation.

2. The method according to claim 1 further comprising preventing from reallocating one of the at least one non-sharded task to another compute core.

3. The method according to claim 1 further comprising reallocating one of the at least one non-sharded task to another compute core when none of the one or more background task shards are reallocated.

4. The method according to claim 1 wherein the reallocating comprising selecting in random the another compute core.

5. The method according to claim 1 wherein the determining that the system status triggers the need to reduce the load imposed on the compute core follows an addition of one or more added compute cores to the storage system.

6. The method according to claim 5 further comprising reallocating the at least one background task shard to an added compute core of the one or more added compute cores.

7. The method according to claim 1 wherein the determining that the system status triggers the need to reduce the load imposed on the compute core is a part of a load balancing process for balancing loads imposed on multiple processing nodes of the storage system.

8. The method according to claim 1 wherein the reallocating comprises selecting the at least one background task shard based on an age of the at least one background task shard, wherein the age of the at least one background task shard represents a time lapsed from a reception of the at least one background task shard by the compute core.

9. The method according to claim 8 wherein the reallocating comprises prioritizing reallocating older background task shards over reallocating of younger background task shards, wherein an age of the older background task shards is higher than an age of the younger background task shards.

10. The method according to claim 1 wherein the reallocating of the at least one background task shard is made to the another compute core of the storage system, the another compute core has a load that is lower than the load of the compute core.

11. The method according to claim 1 wherein the one or more background task shards belong to one or more background tasks that comprise a certain background task that is related to a content written to the storage system, the certain background task is executed after the writing of the content to the storage system.

12. The method according to claim 1 wherein the reallocating is responsive to loads associated with an execution of the at least one non-sharded task.

13. The method according to claim 1 wherein a response time of the storage system is more sensitive to (a) an execution of the I/O request, than to (b) an execution of the one or more background task shards.

14. The method according to claim 1 further comprising assigning at least one out of (a) an additional non-sharded task and (b) an additional background task shard, to the compute core.

15. The method according to claim 14 wherein the assigning of the at least one out of (a) the additional non-sharded task and (b) the additional background task shard follows a removal of one or more other compute cores from the storage system.

16. A non-transitory computer readable medium for resource allocation in a storage system, the non-transitory computer readable medium stores instructions for:

sharding a background task into multiple background task shards, and assigning, to each of the multiple background task shards, a responsibility for a part of a storage address space, wherein different background task shards of the multiple background task shards are assigned with different parts of the storage address space;

determine that a system status triggers a need to reduce a load imposed on a compute core of the storage system, wherein the compute core is responsible for executing (a) one or more background task shards that are assigned to the compute core from the multiple background task shards, and (b) at least one non-sharded task for responding to an input/output (I/O) request sent to the storage system; wherein the one or more background task shards are related to tasks that differ from responding to I/O requests sent to the storage system; and reducing the load imposed on the compute core by reallocating at least one background task shard of the one or more background task shards, being executed by the compute core, to another compute core of the storage system, without changing the responsibility of the at least one background task shard, upon the reallocation.

17. A storage system comprising multiple compute nodes that comprises compute cores, multiple storage nodes and a load balancer, wherein the load balancer is configured to:

shard a background task into multiple background task shards, and assign, to each of the multiple background task shards, a responsibility for a part of a storage address space, wherein different background task shards of the multiple background task shards are assigned with different parts of the storage address space;

determine that a system status triggers a need to reduce a load imposed on a compute core of the storage system, wherein the compute core is responsible for executing (a) one or more background task shards that are assigned to the compute core from the multiple background task shards, and (b) at least one non-sharded task for responding to an input/output (I/O) request sent to the storage system; wherein the one or more background task shards are related to tasks that differ from responding to I/O requests sent to the storage system; and reduce the load imposed on the compute core by reallocating at least one background task shard of the one or more background task shards, being executed by the compute core, to another compute core of the storage system, without changing the responsibility of the at least one background task shard, upon the reallocation.

\* \* \* \* \*